United States Patent [19]

Stuckert

[11] 4,295,039
[45] Oct. 13, 1981

[54] METHOD AND APPARATUS FOR ACHIEVING SECURE PASSWORD VERIFICATION

[75] Inventor: Paul E. Stuckert, Katonah, N.Y.

[73] Assignee: International Business Machines Corporation, Armonk, N.Y.

[21] Appl. No.: 99,797

[22] Filed: Dec. 3, 1979

[51] Int. Cl.³ .................. G06K 5/00; G06K 19/06; H04Q 9/00; G06F 7/00
[52] U.S. Cl. .................. 235/380; 235/492; 235/379; 340/149 A; 364/900
[58] Field of Search .............. 235/380, 492, 441, 379, 235/381, 382, 493, 439; 250/568, 569; 360/2; 340/149 R, 149 A, 152 T; 364/408, 900

[56] References Cited

U.S. PATENT DOCUMENTS

| | | | |
|---|---|---|---|
| 3,594,727 | 7/1971 | Braun | 235/379 |
| 3,806,874 | 4/1974 | Ehrat | 340/149 R |
| 3,906,460 | 9/1975 | Halpern | 235/439 |
| 3,971,916 | 7/1976 | Moreno | 235/492 |
| 3,978,320 | 8/1976 | McBride | 235/493 |
| 4,007,355 | 2/1977 | Moreno | 235/492 |
| 4,023,013 | 5/1977 | Kinker | 340/149 A |
| 4,123,747 | 10/1978 | Lancto | 340/149 A |
| 4,234,932 | 11/1980 | Gorgens | 235/379 |

*Primary Examiner*—Robert M. Kilgore
*Attorney, Agent, or Firm*—Roy R. Schlemmer, Jr.

[57] ABSTRACT

A method and apparatus for identifying an individual holder (person) of an unalterable charge card-like device (CARD) at a utilization terminal (U/I Terminal) wherein a unique user entered key (asserted key $K_A$) is handled in a highly secure manner. The holder of the CARD causes same to be placed in a data coupling mode with the U/I Terminal. At this point, the person enters asserted key ($K_A$) via a keyboard associated with said system. A random word is generated by at least one random word generator located in said CARD and this random word is encrypted utilizing the asserted key $K_A$ entered by the holder at the keyboard and also encrypted under a true key $K_T$ stored in said CARD. The random word encrypted under the asserted key $K_A$ is stored in said U/I Terminal and the random word encrypted under the true key $K_T$ is stored in the CARD. The U/I Terminal then causes the encrypted word stored in the CARD to be transferred to the U/I Terminal and the two encrypted words are compared for identity.

If the comparison is true, the holder of the card has entered the correct asserted key $K_A$ into the system, and his identity is presumed to be true.

According to a first embodiment of the invention, the keyboard is actually located in the U/I Terminal, sacrificing some security for the person's asserted key $K_A$.

According to a further embodiment of the system, the CARD is inserted into a personal portable transaction terminal (XATR) which is then inserted into the U/I terminal. Said XATR in the possession of the holder of the CARD contains a keyboard for entering the individual's asserted key $K_A$. Additional means are provided when the two encrypted random words are to be transferred between the U/I Terminal and the CARD for comparison so that the transfer occurs simultaneously in bit serial mode and in the opposite order of bit significance, and whereby any attempt to subvert the data flow path within the XATR will be impossible.

18 Claims, 5 Drawing Figures

METHOD AND APPARATUS FOR ACHIEVING SECURE PASSWORD VERIFICATION

TECHNICAL FIELD

The present invention addresses what is sometimes referred to as the "card-person pairing problem". This problem exists whenever a person presents any sort of card or token, such as a credit card, debit card, identification card, etc. to another entity such as a retailer, bank, access control station, computer access terminal, etc., as evidence of the right or privilege of the person presenting said card to enter into some sort of privileged relationship relative to said entity such as credit, goods, services, facility access, etc. Obviously, the question which must be satisfactorily answered is, "Is the person presenting the card or token the person who is entitled to have same?". Thus, in essence, the problem to be solved is one of adequately identifying the person, based on information contained in the card. From this information the entity seeking to verify the identity of the person must determine that said identity is correct.

It is also highly desirable in such systems, from the standpoint of the person having such a card or token, that unscrupulous business entities such as retailers or the like are not able to fraudulently obtain confidential information from various persons utilizing such identification means, which information may be later used to obtain money, goods, etc., using said fraudulently obtained identification information.

Numerous solutions to the "card-person pairing problem" exist. Typical of these are facility access systems of various kinds wherein a machine readable token or card containing a number stored therein is inserted into an appropriate instrument and concurrently an individual seeking access to the facility keys in a memorized personal identification number (PIN). The individual PIN is then altered in a predetermined fashion and finally a comparison is made between the altered PIN and that read from the card. Entry is predicated upon a successful comparison thereof. U.S. Pat. No. 3,846,622 of M. R. Meyer, U.S. Pat. No. Re. 29,057 of Enikeieff et al, and U.S. Pat. No. 3,611,293 of Constable, are typical systems.

In all of these patents both the number read from the card and also the memorized PIN of the person passes at one time or another into the control of the facility terminal. Thus, a security leak or an intentional tap at the terminal could result in the unauthorized and fraudulent access to the associated PINs.

U.S. Pat. No. 3,579,186 of Johnson and U.S. Pat. No. 3,806,704 of Shinal both disclose systems wherein the identification criteria comprises a person's signature and which disclose the basic combination of a signature verification system including a credit card-like device which carries data representative of the signature dynamics of an individual. It further utilizes a reading station or facility access station wherein a person signs his name whereby similar dynamic signal characteristics are generated and compared against those stored on the credit card-like device presented to the system.

Other personal identification systems include recognition means such as "voiceprint", or "fingerprint." These are recognition and identification schemes wherein a person's fingerprint or voiceprint is compared against a previously taken fingerprint or voiceprint which is stored either on a credit card-like device carried by the person or stored in a central system memory, depending upon the complexity of the comparison and other factors which will be well understood by those skilled in the art.

Many of the more sophisticated identification systems such as signature, voice, and fingerprint are rather complex in nature and conventionally require significant amounts of computational time in order to accurately analyze and compare the necessary data to effect a recognition or approval type of operation.

Similarly, most of the currently used credit banking systems require entry of a PIN into the terminal, which number is then utilized in systems including encryption procedures, communication networks and a host Central Processing Unit (CPU) to provide the requisite identification.

In contrast, the present invention presents a system in which the valid possession of a personal identification card is established when the person provides a key which is identical to a key which is electronically stored in the card. The card itself is similar to that described in U.S. Pat. No. 3,806,874 of Kurt Ehrat, entitled "Identification System for Individuals." An essential feature of such a card is that it be so constructed that it is virtually impossible for anyone to either alter the circuitry in the card or to in any way either detect or alter the informational content of said card and circuitry other than in a manner which is intended by the design of the card.

Before proceeding with a detailed description of the present invention the following definition of terms is set forth in an effort to clarify and standardize the subsequent description. This is necessary due to the many and varied types of systems which exist in the personal identification area which utilize many different terms, some of which are synonymous and some of which are not. In the following description the term "person" will be used whenever the person or individual holder of a credit card-like device is being referred to. As will be apparent, this person could be the customer of a store, a bank, or someone seeking to gain entrance to or use of a physical facility such as a factory or computer terminal.

The credit card-like device or token will be referred to hereinafter as a "CARD" and, as will be apparent, could take on a number of different physical forms. The particular physical requirements insofar as computational circuitry, storage, etc., are set forth in detail subsequently. Such a CARD could be utilized at a bank's cash issuing terminal, a teller operated terminal, a point of sale terminal in a department store, or an identification terminal located at a physical facility.

The terminals to which such a CARD is to be presented will be referred to hereinafter as a Utilization-/Identification Terminal or "U/I Terminal". Regardless of the ultimate utilization of the terminal, for the purpose of the present invention, identification of the person is the function with which the present invention is concerned.

The type of organization having such a U/I Terminal whether it be a bank, department store, or some other commercial establishment will be referred to as the "utilization entity".

As will be apparent from the following description of the present invention, it is required that the person holding the CARD enter a memorized number via a keyboard into the identification system. This number is then utilized as an encryption key as will be understood from the following description. While the number is, in essence, a personal identification number or PIN, in view of the use of the number in the present system, it will be referred to herein as the asserted key. This asserted key is in contrast with a true key permanently stored in the CARD. Thus, the asserted key is memorized and must be entered by the person into the U/I Terminal. Similarly, the key stored in the CARD will be referred to subsequently as the true key. For convenience of reference the asserted key and the true key will be specifically called "the key $K_A$" and "the key $K_T$" respectively.

Figure 2:
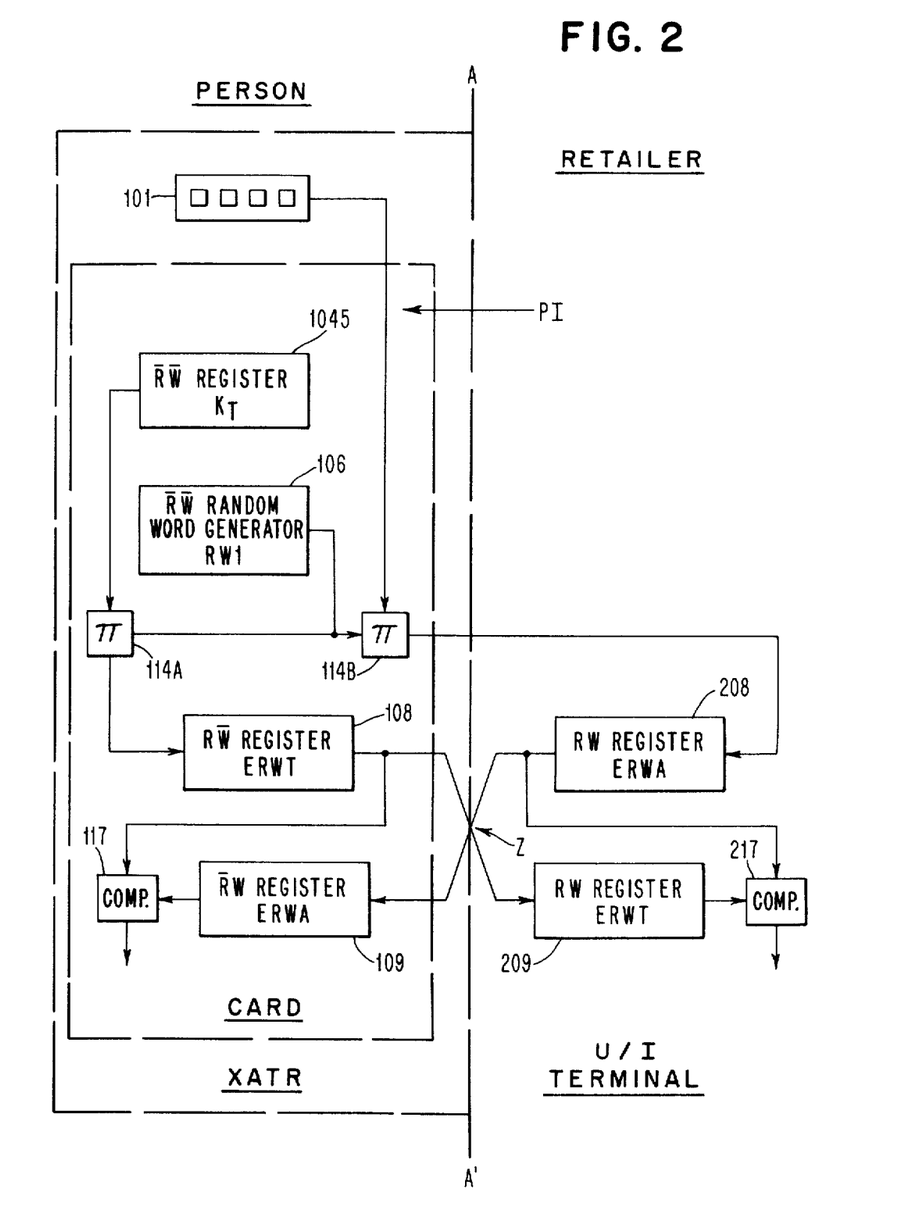
FIG. 2 is a similar high level functional block diagram of an alternative embodiment of the system utilizing a XATR as an interface between the person's CARD and the U/I Terminal.
Figures 3, 3A:
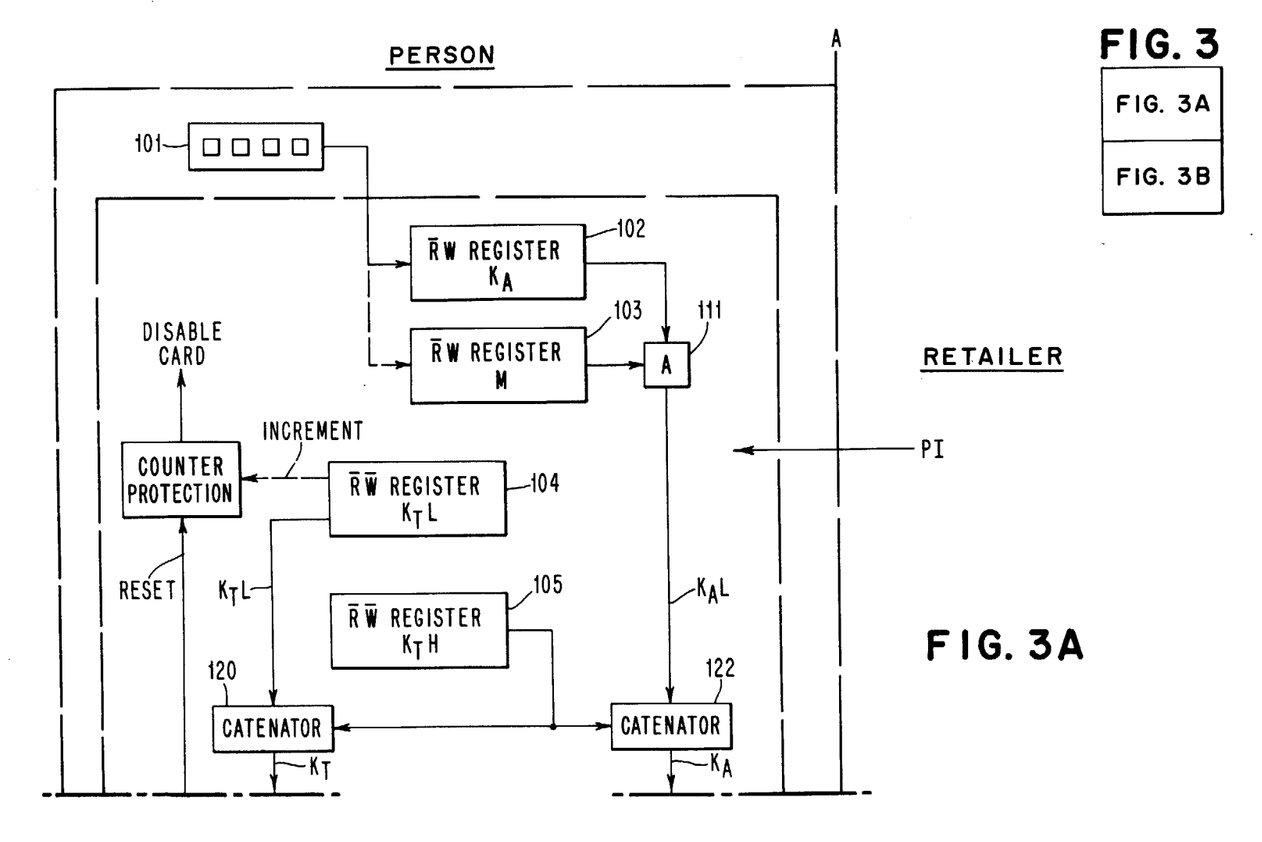
FIG. 3 is a functional diagram of a system configured similarly to that of FIG. 2 having additional functional features included for simplifying the entry of the key $K_A$ (only a portion thereof need be entered) and further including an automatic protection device embedded therein.
Figure 3B:
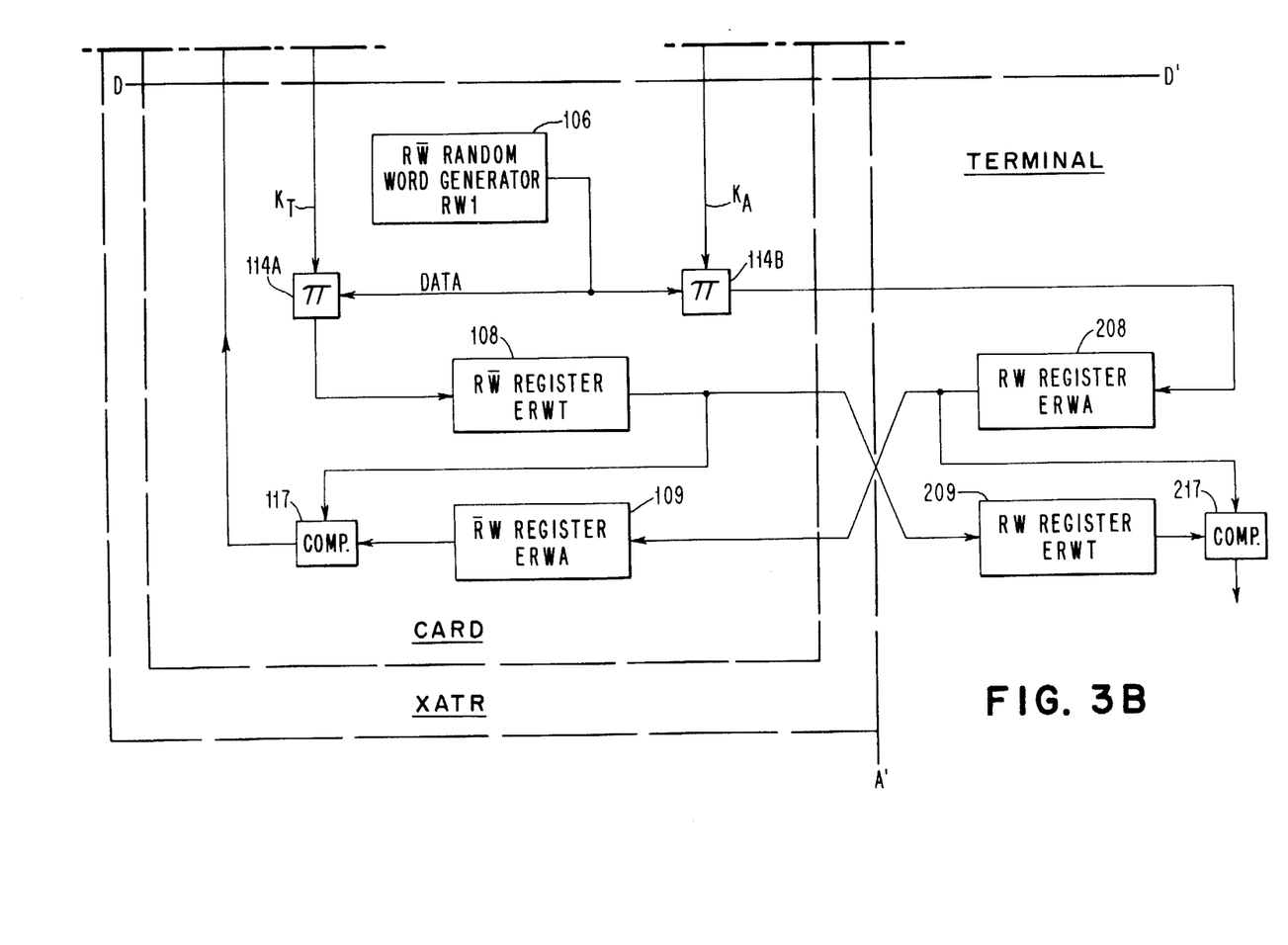

Finally, in the embodiments of FIGS. 2 and 3, a personal portable terminal device is utilized by the person to interface between the CARD and U/I Terminal. As will be apparent from the subsequent description, the personal portable terminal device performs both an interface function between the CARD and the U/I Terminal and also provides a keyboard for entering the key $K_A$ into the system. In the subsequent description and in the drawings the term "XATR" will be utilized to refer to such terminal.

In one embodiment of the invention the CARD is first placed in a XATR which is then placed in a data exchange relationship with an U/I Terminal such as a Point of Sale Terminal (POST), or the like, at the facility where the person wishes to establish his identity. The XATR is provided with a keyboard which allows the person to enter his memorized key $K_A$ into the system with minimum exposure to unauthorized copying or retention. Such a XATR is disclosed in detail in copending application Ser. No. 866,197 of the present inventor entitled, "Personal Portable Terminal for Financial Transactions" filed Dec. 30, 1977.

BACKGROUND ART

The most relevant background art in this area known to the inventor is set forth in the previous Technical Description section. It is noted that the personal identification area is extremely active and highly developed at this time. At the heart of most current personal identification number/credit card systems are sophisticated, secure encryption systems, the best known of which is the key-controlled block cipher cryptographic system adopted by the National Bureau of Standards as a Federal Information Processing Standard entitled "Encryption Algorithm for Computer Data Protection". The Standard together with a complete technical description is contained in the publication, "Data Encryption Standard," Federal Information Processing Standard (FIPS), Publication 46, National Bureau of Standards, U.S. Department of Commerce, January 1977. U.S. Pat. No. 3,958,081 specifically discloses a hardware embodiment of an encryption device which fully complies with the above identified standard.

SUMMARY OF THE INVENTION

It has now been found that a substantial need in the business, banking, and financial community may be satisfied by an identification system including a unique CARD containing data storage and computational capabilities built into same. The card is further characterized by the fact that neither the circuitry nor any data stored therein be susceptible to alteration or unauthorized access subsequent to the manufacture or issuance thereof. Embedded in the CARD are a plurality of storage registers, a random word generator and at least one key controlled block-cipher encryption device. The bank or other entity issuing the CARD causes the person's true key $K_T$ to be stored within the CARD. The person memorizes this key for subsequent entry into a U/I Terminal, or a XATR as the key $K_A$. A random word is produced by the system, which random word is simultaneously encrypted under the key, $K_T$, and the key, $K_A$, entered at a keyboard by the person. The results of the encryptions of this random word are subsequently compared to determine if the two keys are the same. If they are, the person presenting the card is considered to be properly identified. The true key, $K_T$, permanently stored within the CARD is never available outside of the CARD, i.e., only the random word encrypted under $K_T$ is available outside of the CARD. Further, in one of the disclosed embodiments the keyboard entered key, $K_A$, is not available to the U/I Terminal, only the random word encrypted under said key is.

DESCRIPTION OF THE INVENTION

According to the broadest aspect of the present invention, a personal identification system is provided which includes the combination of a CARD which is issued to a person and a U/I Terminal. The CARD is so constructed that access to secure data stored therein is impossible. Any alteration of the functional operation of the circuitry contained therein subsequent to manufacture or issuance is also prevented. The CARD contains at least a secure storage means for a key $K_T$ unique to the person, means for generating or obtaining a random word to be encrypted under said key, $K_T$, a key controlled block cipher encryption device, and means for transferring the encrypted random word to a U/I Terminal for subsequent comparison. The U/I Terminal provided at the utilization entity includes the following functional components:

means for interfacing, in a data communication relationship with the person's CARD, keyboard means whereby the person whose identity is to be verified may enter his memorized key $K_A$, means for generating or otherwise obtaining a random word which is to be encrypted by suitable encryption means located both on the CARD and also within the U/I Terminal, a key controlled block-cipher encryption device identical to that in the CARD for encrypting said random word under the key $K_A$ entered by the person via the keyboard, means for comparing the result of the encryption of the random word in the U/I Terminal with the encryption of the random word in the CARD and, means for indicating the result of the said comparison.

Figure 1:
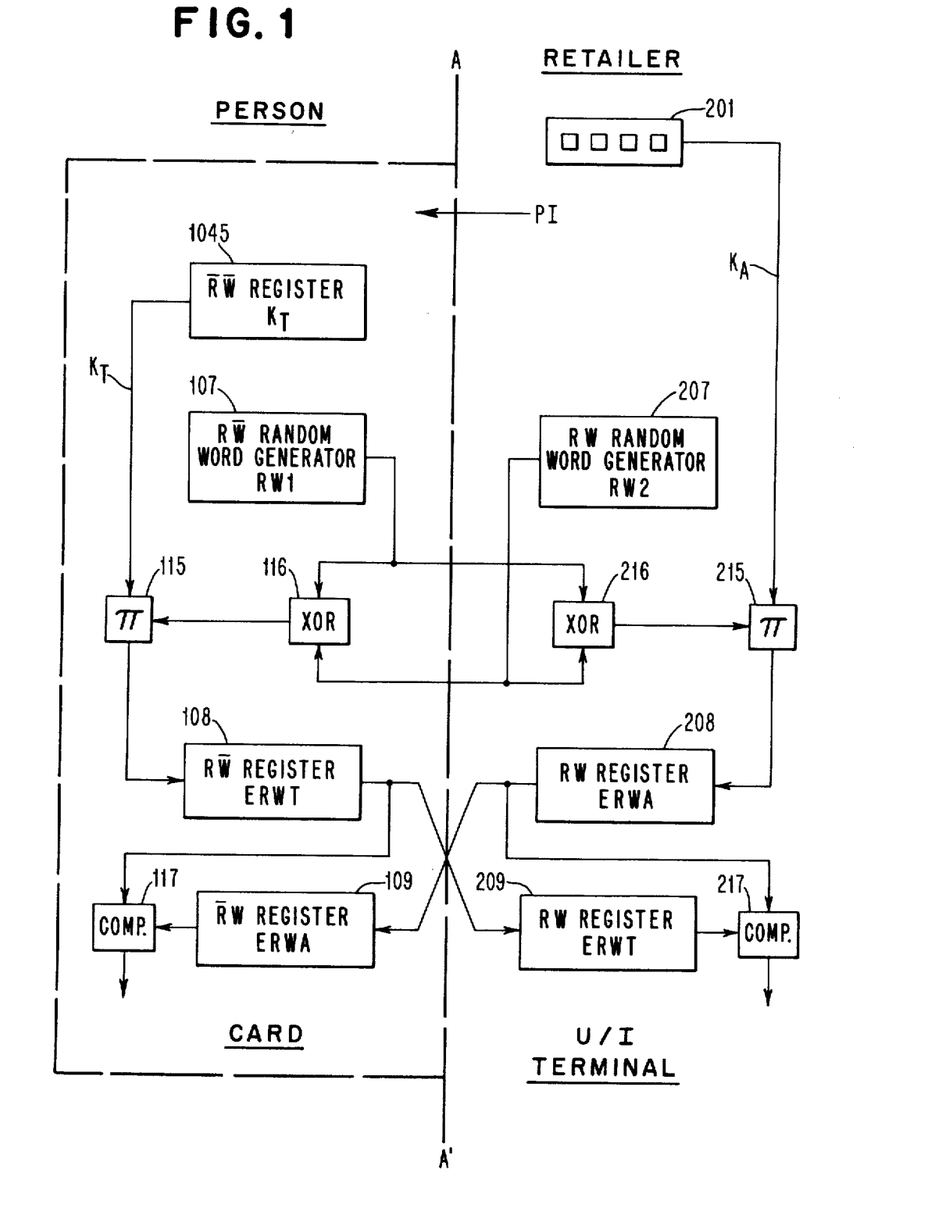
FIG. 1 is a high level functional block diagram of a CARD U/I Terminal identification system showing the significant functional components of such a system constructed in accordance with the teachings of the present invention.

To summarize, the operation of the present system includes the generation of a random word either in the CARD, the U/I Terminal, or by a combination of the two, and then separate encryptions of this random word under the two keys, $K_T$ and $K_A$. The key, $K_T$, is stored in a secure storage location in the CARD and the key, $K_A$, is entered by the person at a keyboard which may be located in the U/I Terminal. In the embodiment of FIG. 1, the two encryptions occur in identical encryption devices, the first being located in the CARD and the other in the U/I Terminal. If both keys are the same, the encrypted random words will be identical.

It will be noted that the embodiment just described, wherein the keyboard is located within the U/I Terminal, suffers from the disadvantage, from the standpoint of the person's security, of actually placing the person's asserted key $K_A$ within control of the U/I Terminal and thus, any individuals having access thereto. Thus, unscrupulous personnel employed by the retailer, bank or other utilizing entity could, over a period of time, compile a list of valid user keys ($K_A$) which could be used fraudulently. This shortcoming of the embodiment set forth in FIG. 1 is overcome by the system disclosed in FIG. 2, wherein a XATR of a type set forth in the above-identified copending application is an interface between the U/I Terminal and the CARD. The XATR in the present system provides a keyboard which is under the control of the person entering an asserted key $K_A$. The XATR also serves as a communication, data, and control interface between the CARD and U/I Terminal. In the embodiment of FIG. 2 the circuit configuration of the CARD is modified so that the encryption of the random word under both the true key $K_T$ stored in the CARD and under the key $K_A$ are both performed within the CARD. In this embodiment the two versions of the encrypted random word, are both transferred to the U/I Terminal and to a comparison circuit located, therein, wherein an affirmative comparison indicates that the proper asserted key $K_A$ has been entered by the person. In this latter embodiment, as is apparent, the person gains greater security because his asserted key $K_A$ never passes into the U/I Terminal.

In all embodiments, in order for the utilization entity to have adequate protection it should be understood that it is of greatest importance that the CARD carried by the individual be unalterable in data content, circuit function or data paths. Thus, for example, if the person presenting the CARD could alter the circuitry on the CARD to cause the same encrypted random word to be transferred to the U/I Terminal as was received from the U/I Terminal, the system would be compromised. According to a further aspect of the invention means are provided for disabling the CARD in the event of an attempted unauthorized use should the card be lost or stolen. Circuitry is provided within the CARD to electronically disable the CARD in the event of one or more unsuccessful comparison operations. The number of comparison failures necessary to cause disabling of the CARD would be predetermined by the system designers. In this way a number of legitimate mistakes by a person entering his key $K_A$ would be permitted.

DESCRIPTION OF THE DISCLOSED EMBODIMENTS

In the embodiments of FIGS. 1, 2 and 3 only the significant functional units of the system are disclosed. These are the significant storage registers and functional elements such as the encryption blocks, random word generators, and the comparison and catenation circuits. The gates for transmitting data between registers or between registers and functional units and their operation are considered obvious to a digital circuit designer. Similarly, the sequential controls could comprise a system clock including a number of interconnected single shot circuits or a small microprocessor having an associated microprogrammed memory for effecting the various sequential operations required. The control of the functional units within the CARD could either be accomplished by a microprocessor or a system clock physically located within the CARD wherein the operation is initiated by a single control pulse from the U/I Terminal or alternatively all of the control functions could be performed by a microprocessor located within the U/I Terminal and transmitted to the CARD via the interface between the Card and the Terminal. In the embodiments of FIGS. 2 and 3 the XATR device functions primarily as a communication path for both data and control information.

The power for operating the circuitry within the CARD would optimally be obtained via inductive coupling between the CARD and the XATR, rather than being carried directly within the CARD. Typical circuitry and interconnection means for such coupling are set forth in the above-identified copending application Ser. No. 866,197 of the present inventor entitled, "Personal Portable Terminal for Financial Transactions".

It should be understood that the required key length for the FIPS 'Data Encryption Standard' is 56 binary bits. Such a binary key is derived from a decimal keyboard entry by decimal to binary conversion employing conversion algorithms well known in the art.

Referring now to the embodiment of the present invention as set forth in FIG. 1 of the drawings, it will be noted that all reference numerals beginning with "1" refer to circuitry located in the CARD, and all reference numerals beginning with "2" refer to circuitry located in the Utilization/Identification Terminal. It will also be noted that the line A—A' defines the interface between the person and the retailer wherein the Utilization/Identification Terminal would normally be a Point of Sale Terminal (POST). It will of course be understood that this terminal could take on a number of different forms and perform a number of different functions other than point of sale. Thus, for example, it could be a banking terminal, facilities access terminal, or the like. Regardless of the particular utilization, the final occurrence of a 'compare' in block 217 of the terminal, would indicate that the person holding the CARD was a properly identified person. Similarly, a 'no compare' would indicate that an unauthorized person was attempting to use the CARD or that the person's memorized key $K_A$ was improperly entered.

All of the functional blocks within FIGS. 1, 2 and 3 are labeled. Also included within each block is a statement of the particular data therein or generated by the system. Additionally, there is an indication in each of the blocks located on the CARD of the accessibility of the particular unit to the interface. Thus, the following four symbols are used in various combinations:

R: can be read
W: can be written
$\overline{R}$: cannot be read
$\overline{W}$: cannot be written These symbols define and limit the interface functions which the various units perform in the overall system operation, and it should be clearly understood it is exceedingly important that this functional integrity be maintained in order that the system be secure.

Proceeding now with a description of the operation of the system of FIG. 1, it is to be understood that this system has limited security insofar as the person is concerned since he must enter the key $K_A$ via the keyboard 201 located in the U/I Terminal. It is also assumed in this embodiment that no XATR is available either because the system is not adapted for it or because the person does not have one. Instead, a slot or location is provided at the U/I Terminal to serve as a data interface. It is also assumed that the U/I Terminal may be rendered adequately secure to discourage unscrupulous employees from accessing and keeping a record of various individuals' keys $K_A$.

As stated previously, communication between the CARD and the U/I Terminal could be by a number of means well known in the art. These include direct connection, as indicated, inductive coupling, or the like. It is also assumed that the circuitry within the CARD would be powered inductively from a power source in the U/I Terminal, rendering the CARD less bulky. Similarly, the control sequences could be performed by either a series of sequential single shot circuits or by a small microprocessor and control store therefor which could be located either within the CARD or in the U/I Terminal and connected to the CARD via appropriate control lines as will be well understood by those skilled in the art.

To proceed now with the description of the operation of the system, the person first places his CARD on or in a U/I Terminal, which in the embodiment of FIG. 1 is a retailer's Point of Sale Terminal (POST). Communication between the CARD and the U/I Terminal is established. First, the person enters his key $K_A$ via the keyboard 201 in the U/I Terminal. At this point all activity by the person ceases.

The U/I Terminal, through an appropriate signal, designated by the arrow P.I. (perform identification), initiates a program stored within the CARD to perform the following operations to establish the validity of the key $K_A$ entered by the person via the keyboard 201.

Simultaneously: (1) the CARD delivers the contents of key storage register 1045, which is the true key $K_T$ to the key input of the encryption device 115, and (2) the U/I Terminal delivers the keyboard entered key $K_A$ from the keyboard 201, as the asserted key input to the encryption device 215 (identical to 115).

Next, the following operations occur simultaneously in the CARD and U/I Terminal: (1) the CARD delivers a random word from the Random Word Generator 107 to one input of exclusive OR circuit 116 located on the CARD and to one input of the exclusive OR circuit 216 located in the U/I Terminal, and (2) Random Word Generator 207 delivers random word RW2 simultaneously as the second input to exclusive OR circuit 116 in the card and to exclusive OR circuit 216 in the U/I Terminal. The two exclusive OR circuits 116 and 216 located on the CARD and in the U/I Terminal, respectively, deliver the same composite random word to their respective encryption devices 115 and 215, as the data input. The two encryption operations are performed substantially simultaneously and the output of the encryption device 115 is stored in register 108 as the true encrypted random word (ERWT). The output from encryption device 215 is stored in register 208 as the asserted encrypted random word (ERWA).

At this point the ERWT which is stored in register 108 in the CARD is transferred to register 209 in the U/I Terminal and the ERWA which is stored in register 208 in the U/I Terminal is transferred to register 109 in the CARD. It should be noted that these transfers occur in the reverse order in the preferred embodiment of the invention for reasons which will be explained subsequently, i.e., most significant bit last, least significant bit first; and most significant bit first, least significant bit last. Simultaneous to the transfer operation the contents of registers 108 and 208 are gated into compare units 117 and 217, respectively, the other inputs thereto are provided by registers 109 and 209 respectively. Since the devices 115 and 215 are identical, the two encrypted outputs ERWT and ERWA will be the same provided the two keys, $K_T$ and $K_A$, are identical. Thus, the two compare units simultaneously reach 'valid' or 'invalid' decisions based on ERWT and ERWA. If a 'valid' decision is reached, the person has entered the proper key $K_A$ at the keyboard and he is properly identified for whatever transaction he wishes to consummate at the U/I Terminal.

The function of compare unit 117 is to activate disabling circuitry of the type shown in FIG. 3 which will be described later. It will be noted, however, that this is not a requirement of the most basic system.

While the disclosed embodiment of the system shown in FIG. 1 is considered the preferred embodiment, it should be noted that it would be possible to dispense with the registers 109 and 209 in the CARD and in the U/I Terminal respectively. In this case the contents of the register 108 in the CARD would be transferred directly to compare unit 217 and similarly the contents of register 208 in U/I Terminal would be transferred directly to the compare unit 117 without temporary storage in the registers 109 and 209. If it is assumed that some storage capacity is present in either the output of the encryption devices 115 and 215 or at the double inputs of the comparison units 117 and 217 the following could occur. The output of encryption device 115 could be simultaneously transferred into compare unit 117 and 217 respectively, and the output of encryption device 215 could be simultaneously transferred to compare unit 217 and 117. Both of these alternate embodiments require that the CARD be absolutely unalterable to prevent the person fraudulently retransmitting ERWA back to the U/I Terminal and thus force a compare in compare unit 217. This subject will be discussed later with respect to the embodiment of FIG. 2.

It should be understood that in order to maintain the amount of circuitry within such a system at a minimum and, in particular, on the CARD, it is preferred that all data transfers between the CARD and the U/I Terminal occur in bit serial fashion rather than in parallel. However, since the encryption devices are key controlled block cipher units, the entire key and data blocks must be submitted to same before they can proceed with the encryption. Similarly, a complete block of data is delivered to the output register of the encryption device. Parallel operation of the system is, of course, possible.

In addition to the previously mentioned design alternatives wherein registers 108, 109 and 208, 209 could be dispensed with and the two encrypted random words ERWT and ERWA forwarded directly to the compare circuit 217, other changes could be made in the system without departing from the spirit and scope of the invention. Another possible alteration would be to dispense with the generation of the two random words RW1 and RW2 and replace same with a single random word generator within the CARD or U/I Terminal which word is delivered to both encryption devices 115 and 215.

Referring now to FIG. 2, an alternative embodiment of the invention is disclosed wherein the person has a personal portable transaction device, or XATR, at his disposal which has means for interfacing with the CARD and with the U/I Terminal. In FIG. 2 it will be noted that the line A—A' again refers to the interface between the U/I Terminal and the XATR and CARD combination, i.e., the person and the Retailer. The XATR is indicated by the outer dashed line to the left of the interface line A—A' and the CARD and its circuitry are indicated. It will be seen from the figure that the XATR provides a keyboard 101 for entering the key $K_A$ which is totally within the control of the person presenting the CARD. In addition, the XATR provides the communication or interface function between the CARD located therein and the U/I Terminal.

The operations performed by the encryption circuitry, etc., in the embodiment of FIG. 2 are essentially the same as those of FIG. 1. The principal exception to this is that the distribution of functions between the CARD and U/I Terminal is different. In the embodiment of FIG. 2 the key $K_A$, which is entered via the keyboard 101, never passes into the Terminal. Consequently, the second encryption device, shown in FIG. 2 as 114B, is located in the CARD. Again, the circuitry within the CARD may not be altered in any way by the person to whom said CARD is issued.

The operation of the system is as follows. With the CARD in position in the XATR and the XATR appropriately connected to the U/I Terminal, a transaction initiation button is actuated. The person enters the key $K_A$ into the keyboard 101 of the XATR. $K_A$ is communicated to the encryption device 114B as the key input. Simultaneously, the key $K_T$ stored in register 1045 is gated as the key input to the encryption device 114A.

The data input to the two encryption units 114A and 114B both located on the CARD is generated by the Random Word Generator 106. Since both encryption devices are located on the CARD it is not necessary and serves no useful security function to have two random word generators as in the embodiment of FIG. 1. The outputs from the two encryption devices 114A and 114B are delivered to registers 108 in the CARD 208 in the U/I Terminal as the true encrypted random word (ERWT) and asserted encrypted random word (ERWA), respectively.

The arrangement of FIG. 2 prevents what would be a relatively simple alteration of the XATR by a person owning same and wishing to defraud the retailer. By slightly altering the data paths within the XATR, the person could cause the output from register 208 to be delivered directly to register 209. Thus, the compare circuit 217 would always give a successful comparison regardless of what key $K_A$ the person entered at the keyboard 101.

To prevent such a fraudulent circuit alteration in the XATR (or even in the CARD) the following occurs: With the ERWT stored in register 108 in the CARD and the ERWA stored in register 208 in the Terminal, the system controls cause data transfer from register 108 to register 209 to occur 'most significant bit first' and 'least significant bit last'. Simultaneously, the data transfer from register 208 to register 109 occurs in the reverse order, i.e., 'most significant bit last, least significant bit first'. Thus, if a direct electrical connection were made at point Z (as shown in FIG. 2) by the person the contents of register 208 would be delivered directly to register 209, however, the bits would be stored in register 209 in reverse order and a compare with the contents of register 208 would fail. Here again, it is reiterated that the data content and circuit configuration within the CARD itself must be unalterable so that there is no way, for example, to load register 108 with the output from encryption device 114B rather than 114A which, of course, would always force a compare.

Proceeding with the final step of the operation of the system, the contents of registers 208 and 209 are compared in unit 217 and if successful the identification of the person is assumed correct and if unsuccessful either a mistake has been made, i.e., the wrong key entered, or the person is an imposter.

Additionally, a test is made in the CARD wherein the contents of registers 108 and 109 are compared by compare circuit 117, the output of this circuit being the input to a CARD deactivating circuit which will be explained subsequently with respect to FIG. 3.

It should also be understood, that in the system of FIG. 2, the specific control mechanisms have not been shown as they are considered to be state of the art and could readily assume a number of different forms as discussed previously with reference to FIG. 1. It should again be noted that in FIGS. 1, 2 and 3, similar reference numbers are utilized to identify similar functional units. For example, in all three embodiments, the numeral 1045 refers to the register for storing the true key, $K_T$. Similarly, register 108 stores the true encrypted random word and register 208 stores the asserted encrypted random word.

It should be noted that in the embodiments of FIG. 2 and FIG. 3 wherein two encryption circuits are shown, i.e., 114A and 114B, it would be possible to eliminate one of the encryption devices by providing control circuitry so that a single encryption device could provide both ERWT and ERWA.

Referring now to FIG. 3, a system similar to FIG. 2 is disclosed utilizing again an XATR as an interface unit between the CARD and the U/I Terminal. In the embodiment of FIG. 3 there are three additional enhancements to the basic system of the FIG. 2. It will be noted that the circuitry in FIG. 3 below the line D/D' is the same as in FIG. 2.

The first enhancement of FIG. 3 is the use of a special counter having a "disable CARD" output which will electronically "destroy" or "disable" a CARD which should no longer be used. Its operation will be apparent from the subsequent description of the figure. The second feature described is the division of the key into high order and low order bits so that the key $K_A$ which must be memorized by the person may be considerably shortened. The third feature involves the use of a special index (M) which may be selectively entered by the individual into a register in the CARD. This index is an offset whereby the key entered at the keyboard may be periodically changed without necessitating any change of the permanently stored key $K_T$.

Referring now specifically to the CARD disabling feature of the embodiment of FIG. 3 it will be noted that a block is provided labeled Counter Protection having one output line labeled 'Disable CARD'. Two intput lines are provided. The first is labeled "Increment" which emanates from register 104 where a quantity $K_TL$ is stored. This line produces a pulse each time register 104 is accessed. The second input from the compare block 117 marked "Reset" resets this counter to zero. This prevents someone finding or stealing a card, placing it in a XATR, and trying different keys $K_A$ until the correct one is found. The counter protection circuit would be set at some predetermined count value. This count value or threshold would allow a reasonable number of honest mistakes on the part of the person entering his key $K_A$. Each time a key is entered and an identification procedure initiated, the register 104 is accessed and a pulse produced. Subsequently, with every successful compare between the registers 108 and 109 a pulse would be produced by 117 and the counter would be reset to zero. However, if a predetermined number of consecutive accesses of 104 should occur without a successful comparison by 117 a 'disable CARD' would be activated by the output from the Counter Protection block which would cause some "invalid" condition to occur in the CARD. This could take on a number of different forms such as, disabling the storage area for $K_T$ so it would not be available to the system. Alternatively, a special register could be provided which would be readable by the U/I Terminal indicating an invalid CARD wherein said register would always be read before any identification procedure began. Other ways in which the CARD could be disabled include setting a latch which burns a fusible link, removing power from the card or interrupting data flow from the CARD. This protection prevents an unauthorized holder of the CARD from presenting the CARD with different keys $K_A$ until the correct one is found.

The second feature of the circuitry shown in FIG. 3 is the division of the asserted key $K_A$ so that a smaller number of digits must be memorized by the person. By adding the two catenation circuits 120 and 122, and the high and low order bit storage registers 105 and 104 respectively for the true key $K_T$ ($K_TH, K_TL$), the key which the individual must remember may be arbitrarily shortened.

The blocks labeled 111, 102 and 103 should be ignored for the following explanation, it being assumed that the keyboard input goes directly to the catenation circuit 122 as the low order bits $K_AL$. The true key $K_T$ is divided into two parts, the low order bits $K_TL$ being stored in register 104 and the high order bits $K_TH$ being stored in register 105. In order to make up the full $K_T$ being transferred to encryption device 114A, a low order portion of the key $K_T$ becomes one input to the catenation circuit 120 and the high order portion from register 105 becomes the second input to the catenation circuit 120. The catenation circuit functions to order these two groups of bits into their proper sequence, i.e., into a single key having the appropriate bits in the high and low order positions. Catenation circuit 122 works in exactly the same way as 120, and forms the full asserted key $K_A$ which is provided as the key input to the encryption device 114B. Thus, $K_TH$ is utilized to make up both the full true key $K_T$ and the full asserted key $K_A$. As will be apparent, security is provided and the size of the key which must be remembered and entered correctly via the keyboard 101 is reduced.

Referring now to the top portion of the CARD shown in FIG. 3A, two registers 102 and 103 and the adder circuit 111 are shown which may be utilized to provide a variable key. A quantity M may be entered at any time by the individual and stored in register 103 via the dashed line from keyboard 101. Subsequently the asserted key which is entered via 101 referred to herein as $K_E$ is entered directly into register 102 in the normal fashion. Addition of the two quantities in registers 102 and 103 in the adder circuit 111 produces the partial asserted key $K_AL$. Thus, both M and $K_E$ are N bit data words which when added together produce the N bit key $K_AL$. This may be represented by the formula:

$$K_E + M = K_AL$$

This feature allows the person to periodically alter his asserted key $K_E$ to enhance security.

It should be understood that if the blocks 104, 105, 120, and 122 were deleted that the circuitry represented by blocks 102, 103, and 111 could be used to produce the full asserted key $K_A$.

From the above description of the preferred embodiments of the system set forth in FIGS. 1, 2 and 3, it will be apparent that a number of changes in form and detail would be possible without departing from the overall teachings of the present invention, as set forth in the appended claims.

INDUSTRIAL APPLICABILITY

The presently disclosed invention has applicability for any situation where personal indentification is of importance. It would have particular utility in the retail sales field where the retailer is obviously concerned that the individual seeking credit and having an apparently valid credit card is actually the person entitled to said credit card and thus to credit. Another significant area of potential commercial utilization of the invention is in the financial field and more particularly cash issuing terminals either manned or unmanned wherein a person presents the bank CARD and, upon proper identification, cash is issued to the individual.

The system also has potential utilization in the facility access field wherein an individual is either seeking entry into a physical facility such as a plant or to a computer or to computer files via a terminal where it is important that the individual be properly identified prior to the granting of the desired access.

The function of the CARD is not limited to personal identification transactions, but may well be extended to maintain records of particular business transactions. Thus, subsequent bookkeeping and electronic funds transfer operations utilizing transaction data recorded on the card are possible. For such an application, the CARD would be presented to a banking institution where the transaction data would be transferred to the person's account. In those cases where the transaction data was not previously forwarded to the bank by the U/I Terminal device, the CARD entered data would serve as the sole bookkeeping data input. Conversely, when the transaction data was previously forwarded to the bank the transaction data from the CARD could serve as a check to protect the person and warn him of any unauthorized use of his account or mistakes by the retailer.

In all of the above situations, the presently disclosed system has the advantage of giving the person significant protection as well as providing security for the particular entity having control of the Utilization/Identification Terminal whether it be a point of sale terminal, a computer terminal, a cash issuing terminal or some sort of facility access terminal.

As will also be apparent, the identification system disclosed herein could be combined with other personal identification systems for various high security applications. These might include signature verification systems, fingerprint recognition systems, voiceprint recognition systems and the like.

In summary, the herein disclosed identification system provides a high degree of security for both the person holding the CARD and the entity which ultimately accepts said identification at a suitable U/I Terminal. The system maintains security without recourse to a Host computer which might be subject to breakdown, communication outages, etc., and thus is capable of off-host operation without sacrificing reliability.

Having thus described my invention, what I claim as new, and desire to secure by Letters Patent is:

1. A personal identification system including the combination of a credit card-like device (CARD) to be presented by the holder of the CARD (Person), a Utilization Terminal (U/I Terminal) to which the CARD is presented for identification purposes, and a data interface for the exchange of predetermined data between the CARD and the U/I Terminal, said CARD including means for permanently storing a secret key, $K_T$, unique to said person, said combination further including, encryption means comprising at least one key-controlled block-cipher encryption device located in said CARD, a keyboard at which the person may enter a secret key, $K_A$, at least one random word generator for supplying a data input word for encryption by said encryption means, said encryption means being operable to encrypt a random word supplied by the random word generator under the stored key, $K_T$, and also being operable to encrypt the same random word under said secret key, $K_A$, entered by the person at said keyboard, said encryption means utilizing identical encryption algorithms for each encryption operation, first comparison means in said Terminal for comparing the results of said first and second encryption operations and means for indicating a successful comparison.

2. A personal identification system as forth in claim 1 wherein said encryption means includes a second key-controlled block-cipher encryption device located in said U/I Terminal and identical in operation to the key-controlled block-cipher encryption device on the CARD and wherein said keyboard is located in the U/I Terminal and, means for supplying the secret key, $K_A$, entered by the person via said keyboard to said second crytographic device as the key input thereto.

3. A personal identification system as set forth in claim 2 including a second random word generator located in the U/I Terminal, means for combining the outputs of the first and second random word generators to produce a resultant random word and means for supplying the resultant random word as the data input to both said first and second encryption devices.

4. A personal identification system as set forth in claim 1 including a second comparison means located in said CARD for comparing the outputs of said first and second encryption devices, counter means located in said CARD connected to the output of said second comparison means, means including said counter for recording the number of unsuccessful compares detected by said second comparison means and means actuable upon said counter reaching a predetermined value to disable the circuitry in said CARD.

5. A personal identification system as set forth in claim 1 wherein said combination includes a personal portable transaction device (XATR) interposed between said card and said U/I Terminal in data exchange relationship with both wherein data may be transferred between said CARD and said U/I Terminal, said keyboard being located within said XATR, means for transferring the secret key $K_A$ from the keyboard to the encryption means, the data transfer paths within the XATR being so configured that the keyboard entered secret key $K_A$ is never available at the data interface between the XATR and the Terminal.

6. A personal identification system as set forth in claim 5 wherein said two keys $K_T$ and $K_A$ are divided into at least two segments wherein both segments are necessary for successful operation of the encryption means, said system including means for storing said key $K_T$ in two parts within the CARD and means for combining said two parts to supply the full key $K_T$ to said encryption means, means for entering a portion of the secret key $K_A$ at the Terminal and combining said entered portion with a predetermined portion of said stored key $K_T$ and supplying the result of the combination as the full key $K_A$ to said encryption means.

7. A personal identification system as set forth in claim 5 including means in said CARD for storing an index value which when combined with a value $K_E$ subsequently entered at the keyboard produces a resultant value to be utilized as the key $K_A$, wherein said means for combining comprises a predetermined and fixed combinatorial circuit, and means for selectively entering a new index value into system via said keyboard.

8. A personal identification system for identifying an individual holder (Person) of an unalterable charge-like device (CARD) to a Utilization Terminal (U/I Terminal), means for receiving the CARD device in a data coupling mode with said U/I Terminal, a keyboard associated with said system for receiving a unique encryption key $K_A$ to be entered by the person, at least one random word generator located in said CARD, means for obtaining a unique, random word from the random word generator, means for encrypting said random word utilizing the encryption key, $K_A$, entered by the person at the keyboard and also for encrypting the same random word utilizing a true key, $K_T$, stored in said CARD wherein said key, $K_T$, is not accessible outside of said CARD, means for storing the random word (ERWA) encrypted under the entered key $K_A$ in said U/I Terminal and for storing the random word (ERWT) encrypted under the true key $K_T$ in the CARD, means in the U/I Terminal for causing the encrypted word (ERWT) stored in the CARD to be transferred to the U/I Terminal, means for comparing the two encrypted words ERWA and ERWT for identity, and means actuable on a successful comparison for indicating to the U/I Terminal that the person has entered the proper key $K_A$.

9. A personal identification system as set forth in claim 8 wherein said system includes a personal portable transaction device (XATR) interposed between the CARD and the U/I Terminal including means within said XATR for holding the CARD in data exchange relationship therewith and means within said XATR for coupling with said U/I Terminal in data exchange relationship whereby data may be directly transferred between the CARD and the U/I Terminal via the XATR and wherein said XATR contains said keyboard and means are provided for transferring the key $K_A$ entered by the person directly to the means for encrypting the random word under the key $K_A$, said encrypting means being located within the CARD.

10. A personal identification system as set forth in claim 9 including means for transferring the two encrypted random words ERWA and ERWT between the U/I Terminal and the CARD simultaneously in bit serial mode and in the opposite order of bit significance whereby any attempt to subvert the data flow path within the XATR will cause an unsuccessful comparison at the two encrypted random words by said comparison means.

11. A personal identification system including the combination of a credit card-like device (CARD) to be presented by the holder of the CARD (Person) and a Utilization Terminal (U/I Terminal) to which the CARD is presented for the purpose of identifying the person,
 a data interface for the exchange of predetermined data between the CARD and the U/I Terminal,
 said CARD containing a first key-controlled block-cipher encryption device and a storage means for permanently storing a secret key $K_T$ unique to said user,
 said U/I Terminal containing a keyboard at which the holder may enter a memorized secret key $K_A$, and a second key-controlled block-cipher encryption device identical in operation to the encryption device located in said CARD,
 said combination further including random word generation means for supplying a data input word for encryption by said two encryption devices,
 means for actuating said first encryption device to encrypt a random word supplied by the random word generation means under the stored key $K_T$ and for actuating the second encryption device to encrypt the same random word under the keyboard entered key $K_A$,
 first comparison means in said Terminal,
 means for transferring the encrypted random words from said first and second encryption devices to said first comparison means and means for indicating a successful comparison.

12. A personal identification system as set forth in claim 11 wherein said random word generation means comprises a first random word generator located in said card and a second random word generator located in said U/I Terminal,
 combinatorial circuit means for combining the outputs of said first and second random word generators to produce a third random word which is supplied to said first and second encryption devices as the data word to be encrypted, and storage means located in the CARD and U/I Terminal for respectively storing the outputs of said first and second encryption devices.

13. A personal identification system as set forth in claim 12 including a second comparison means located in said CARD for comparing the outputs of said first and second encryption devices,
 counter means in said CARD connected to the output of said second comparison means, means for incrementing the value stored in said counter whenever an unsuccessful compare is detected by said second comparison means and means actuable upon said counter reaching a predetermined value to disable the circuitry in said CARD.

14. A personal identification system as set forth in claim 13 including means for resetting said counter to zero whenever a successful comparison occurs in said comparison means.

15. A personal identification system including the combination of a credit card-like device (CARD) to be presented by the holder of the CARD (Person) and a Utilization Terminal (U/I Terminal) to which the CARD is presented for the purpose of identifying said person,
 said combination including a personal portable transaction device (XATR) totally under the control of the person having a first data exchange interface for the exchange of data between said CARD and said XATR and a second data exchange interface for the transfer of data between said XATR and said U/I Terminal whereby selected data may be exchanged directly between said CARD and said U/I Terminal via said XATR,
 said XATR including a keyboard at which the holder may enter a secret memorized key $K_A$,
 the CARD including key-controlled block-cipher encryption means and a storage means for permanently storing a secret key $K_T$ unique to said user,
 a ramdom word generator located in said card for supplying a data input word for encryption by said encryption means,
 means actuable upon the presentation to the Terminal of the XATR containing the CARD and the entry of the memorized key $K_A$ into the system to initiate an identification operation, means including said encryption means in the CARD for encrypting a random word supplied by the random word generator under the stored key $K_T$ and means for encrypting the same random word under the key $K_A$ entered by the holder at said keyboard,
 first comparison means within said Terminal for comparing said two encryptions of said random word, and means for indicating a successful comparison.

16. A personal identification system as set forth in claim 15 wherein said means for encrypting the random word under the key $K_T$ comprises a first key-controlled block-cipher encryption device and wherein the means for encrypting the random word under the keyboard entered key $K_A$ comprises a second key-controlled block-cipher cryptographic device identical to said first device wherein the data path between the storage means for said secret key $K_T$ to said first encryption device is totally within said CARD and is not accessible from the CARD's data interface,
 and means for connecting the keyboard in the XATR directly to the second encryption device located within the CARD whereby the key $K_A$ is never accessible to the data interface between the XATR and the U/I Terminal.

17. A personal identification system as set forth in claim 16 including means in said CARD for storing an index value which when combined with a value $K_E$ subsequently entered at the keyboard produces a resultant value to be utilized as the key $K_A$ wherein said means for combining comprises a predetermined and fixed combinatorial circuit, and means for selectively entering a new index value into said system via said keyboard.

18. A personal identification system as set forth in claim 16 wherein said two keys $K_T$ and $K_A$ are divided into at least two segments wherein both segments are necessary for successful operation of the two encryption means, said system including means for storing said key $K_T$ in two parts within the CARD and means for combining said two parts to supply the full key $K_T$ to said first encryption means, means for entering a portion of the secret key $K_A$ at the Terminal and for combining said entered portion with a predetermined segment of said stored key $K_T$ and supplying the result of the combination as the full key $K_A$ to said second encryption means.

* * * * *